US006486469B1

(12) United States Patent
Fischer et al.

(10) Patent No.: US 6,486,469 B1
(45) Date of Patent: Nov. 26, 2002

(54) DIELECTRIC CAPILLARY HIGH PASS ION FILTER

(75) Inventors: Steven M. Fischer, Hayward; Robert K. Crawford, Palo Alto; Charles W. Russ, IV, Sunnyvale, all of CA (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 09/429,063

(22) Filed: Oct. 29, 1999

(51) Int. Cl.[7] ........................... B01D 59/44; H01J 49/00

(52) U.S. Cl. ....................... 250/288; 250/281; 250/290; 250/293

(58) Field of Search ................................ 250/288, 281, 250/287, 310, 311, 282, 290, 293

(56) References Cited

U.S. PATENT DOCUMENTS

| | | | | |
|---|---|---|---|---|
| 4,542,293 A | | 9/1985 | Fenn et al. | 250/288 |
| 5,012,720 A | * | 5/1991 | Tidman | 89/8 |
| 5,412,208 A | | 5/1995 | Covey et al. | 250/288 |
| 5,432,343 A | | 7/1995 | Gulcicek et al. | 250/288 |
| 5,652,427 A | | 7/1997 | Whitehouse et al. | 250/288 |
| 5,726,447 A | | 3/1998 | Aisawa et al. | 250/288 |
| 5,736,741 A | | 4/1998 | Bertsch et al. | 250/288 |
| 5,750,988 A | | 5/1998 | Apffel et al. | 250/288 |
| 5,753,910 A | | 5/1998 | Gourley et al. | 250/288 |
| 5,838,003 A | | 11/1998 | Bertsch et al. | 250/288 |
| 5,844,237 A | | 12/1998 | Whitehouse et al. | 250/288 |
| 5,869,831 A | | 2/1999 | De La Mora et al. | 250/288 |
| 5,936,242 A | | 8/1999 | De La Mora et al. | 250/288 |
| 5,962,851 A | | 10/1999 | Whitehouse et al. | 250/288 |
| 6,060,705 A | * | 5/2000 | Whitehouse et al. | 250/288 |

FOREIGN PATENT DOCUMENTS

| | | | | |
|---|---|---|---|---|
| JP | 52-66488 | * | 6/1977 | 250/288 |

* cited by examiner

*Primary Examiner*—Jack Berman
*Assistant Examiner*—Kalimah Fernandez

(57) ABSTRACT

For delivery of ions from a higher pressure ion source to a mass analyzer operating at high vacuum, high pass ion filtration is effected within a dielectric capillary interface between the higher pressure ionization chamber and the lower pressure environment of a mass analyzer, by application of electrical potentials to end electrodes and to at least one electrode associated with the dielectric capillary between the ends, to create an end-to-end electric field generally opposing gas flow-assisted movement of ions from the upstream end to the downstream end, and to create a steeper voltage gradient along an upstream portion than along a downstream portion of the capillary. The voltage gradient along the steeper upstream portion of the capillary is sufficiently steep to cause ions having drift velocities below a lower limit to stall within the capillary. The respective potentials may be adjusted to increase the steepness of the upstream voltage gradient to increase the drift velocity lower limit.

17 Claims, 4 Drawing Sheets

DIELECTRIC CAPILLARY HIGH PASS ION FILTER

FIELD OF THE INVENTION

This invention relates to mass spectrometry and, particularly, to delivery of ions from a higher pressure ion source through a tubular interface to a mass analyzer operating at high vacuum.

BACKGROUND

Mass spectrometers have been shown to be particularly useful for analysis of liquid or gaseous samples, and mass spectrometry ("MS") can be coupled with gas chromatography ("GC") or liquid chromatography ("LC") for analysis of substances having a wide range of polarities and molecular weights in samples obtained from a wide range of sources.

Mass spectrometers employing atmospheric pressure ionization ("API") techniques can be particularly useful for obtaining mass spectra from liquid samples, and MS employing such ion sources are frequently used in conjunction with high performance liquid chromatography ("HPLC"), and combined HPLC/MS systems are commonly used for analysis of polar and ionic substances, including biomolecular species. In API techniques a liquid sample containing a mobile phase (e.g., solvent) and analytes is introduced into an ionization chamber and there converted to a charged dispersion or aerosol of fine droplets from which ions emerge as the liquid evaporates and the droplets shrink in size. The conversion of liquid to spray or aerosol can be accomplished by any of a variety of techniques. Evaporation of the liquid can be assisted, for example, by passing a flow of warm gas ("drying gas") through the cloud of droplets.

In mass spectrometry apparatus, an interface must be provided between a source of ions to be analyzed, which is typically at high-pressure (at or near atmospheric pressure in API sources), and the enclosure for the mass analyzer, which is typically at very low pressure. In one approach, a tube, having a bore usually of capillary dimension, serves as a conduit for the ions. One end of the capillary opens into the ionization chamber at about atmospheric pressure, and the other end of the capillary opens into the high vacuum chamber.

In some such apparatus the capillary interface is constructed of a dielectric material such as a glass and is provided at the ends with electrodes that are connected with sources of electrical potential. See, for example, U.S. Pat. No. 4,542,293. In conventional operation using a dielectric capillary interface the electrode at the upstream end of the capillary, in the ionization chamber, is held at a high magnitude electrical potential (typically in the range −3000 V to −6000 V for operation in a "positive ion" mode; the polarity is reversed for operation in a "negative ion" mode) and the electrode at the downstream end of the capillary, in the vacuum chamber, is held at a lower magnitude and oppositely charged electrical potential (typically in the range +50 V to +400 V for operation in a "positive ion" mode). Ions are entrained in the flow of gas into the inlet end of the capillary from the higher pressure ion source chamber and carried with the gas, against the opposing electrical field, through the lumen of the capillary and out through the exit end of the capillary into the low pressure chamber downstream.

Various mass spectrometry apparatus employing a capillary interface between an atmospheric pressure ionization ("API") ion source and the mass analyzer are described, for example, in U.S. Pat. No. 5,838,003 (electrospray ionization ["ESI"]), U.S. Pat. No. 5,736,741 (ESI and atmospheric pressure chemical ionization ["APCI"]), U.S. Pat. No. 5,726,447 (corona discharge ionization). These and any other patents and other publications referred to in this application are hereby incorporated herein in their entirety.

Considerable interest has developed, particularly in the pharmaceuticals and medical diagnostics industries, in employing mass spectrometry to analyze large numbers of samples that contain only a few analytes of interest. Typically the sources of the samples are biological fluids such as urine or blood. Samples from such sources contain significant quantities of substances that are not of interest in the analysis, and sample treatment for removal of these substances makes up a significant proportion of the cost of such analyses. Accordingly, some effort has been directed toward reducing the extent of sample treatment prior to introducing the sample to mass spectrometry apparatus. In one approach, tandem mass spectrometry ("MS/MS") has been used in an effort to reduce the need for sample preparation for simple target compound analysis. MS/MS systems are significantly more costly than MS systems.

Techniques have been proposed for separating ions according to their mobility. In such ion mobility separation "IMS" techniques, an accelerating electrical potential is employed, to move ions against a countercurrent gas flow. In IMS, ions having higher mobility have higher drift velocities.

SUMMARY

We have discovered that high pass ion filtration can be effected within a dielectric capillary interface between a higher pressure ionization chamber and the lower pressure environment of a mass analyzer in mass spectrometry apparatus, by application of electrical potentials to end electrodes and to at least one electrode associated with the dielectric capillary between the ends, to create an end-to-end electric field generally opposing the gas flow-assisted movement of ions from the upstream end to the downstream end, and to create a steeper voltage gradient along an upstream portion than along a downstream portion of the capillary. The voltage gradient along the steeper upstream portion of the capillary is sufficiently steep to cause ions having high mobility and having drift velocities below a lower limit to stall within the capillary. The respective potentials may be adjusted to increase the steepness of the upstream voltage gradient to increase the drift velocity lower limit.

The apparatus is inexpensive to construct and simple to operate. Because movement of ions from the higher pressure ionization chamber to the vacuum chamber is according to the invention assisted by gas flow through the capillary interface, ions having higher mobility have lower drift velocities. The high pass ion filter according to the invention can provide for removal of lower drift velocity ions from the population of ions that are delivered to the mass analyzer.

Accordingly, in one general aspect the invention features a conduit for transporting ions from a higher pressure ion source to a mass analyzer at high vacuum in mass spectrometry apparatus. The conduit includes a tube constructed of a dielectric material and defining a capillary bore extending from end to end and having an end electrode associated with each end and at least one additional electrode associated with the tube between the ends. The electrodes are connected to a source of electrical potential.

Electrodes are connected to "a source" of electrical potential, at that term is used herein, when they are electrically connected to separate voltage sources, and also when any two or more of them are electrically connected to a common single source that is provided with circuitry (e.g., resistive networks) that can be used to apply different voltages to the various electrodes.

In operation, electrical potentials are applied at the end electrodes and the additional electrode to generate an end-to-end electric field having a voltage gradient that is steeper along an upstream portion of the conduit than along a downstream portion of the conduit. Ions are carried by the flow of gas from the ion source through the conduit to the high vacuum environment of the mass analyzer, against the end-to-end electrical field gradient. In a positive ion mode the upstream end is kept more electronegative than the downstream end, while in a negative ion mode the upstream end is kept more electropositive than the downstream end. According to the invention, the steeper gradient in the more upstream portion of the conduit retards the downstream movement of ions having drift velocities below a lower limit, so that they are prevented from passing through and out from the conduit. As the retarding voltage gradient is made steeper, the lower limit increases.

In some embodiments at least two additional electrodes are associated with the dielectric tube between the ends.

In another general aspect the invention features a method for delivering ions from a higher-pressure ionization chamber to a mass analyzer operating at high vacuum. The method employs a conduit that includes a tube constructed of a dielectric material and defining a capillary bore from end to end and having an electrode associated with each end and at least one additional electrode associated with the tube between the ends. According to the method, electrical potentials are applied to the electrodes to generate an end-to-end electric field having a voltage gradient that is steeper along an upstream portion of the conduit than along a downstream portion of the conduit. The steeper voltage gradient upstream retards the downstream movement of ions having lower drift velocities and thereby reduces the flow of ions having lower drift velocities through and out from the conduit to the mass analyzer.

The expression "drift velocity", as that term is used in describing the invention herein, is the mean ion velocity within the capillary in a direction from the ionization chamber toward the vacuum chamber. According to the invention, because ion movement from the ionization chamber toward the vacuum chamber is assisted by gas flow (against an opposing electrical potential gradient), ions having higher mobilities have lower drift velocities.

The invention is especially useful in qualitative and quantitative treatment of complex samples in analytical schemes employing mass spectrometry ("MS") coupled with liquid chromatography ("LC"), usually high performance liquid chromatography ("HPLC"). The invention can be especially useful where an atmospheric pressure ionization ("API") technique, such as electrospray ionization ("ESI"), or inductively coupled plasma ionization ("ICP") or atmospheric pressure chemical ionization ("APCI") is employed in LC/MS.

DETAILED DESCRIPTION

Particular embodiments will now be described in detail with reference to the drawings, in which like parts are referenced by like numerals. The drawings are not to scale and, in particular, certain of the dimensions may be exaggerated for clarity of presentation.

Figure 1:
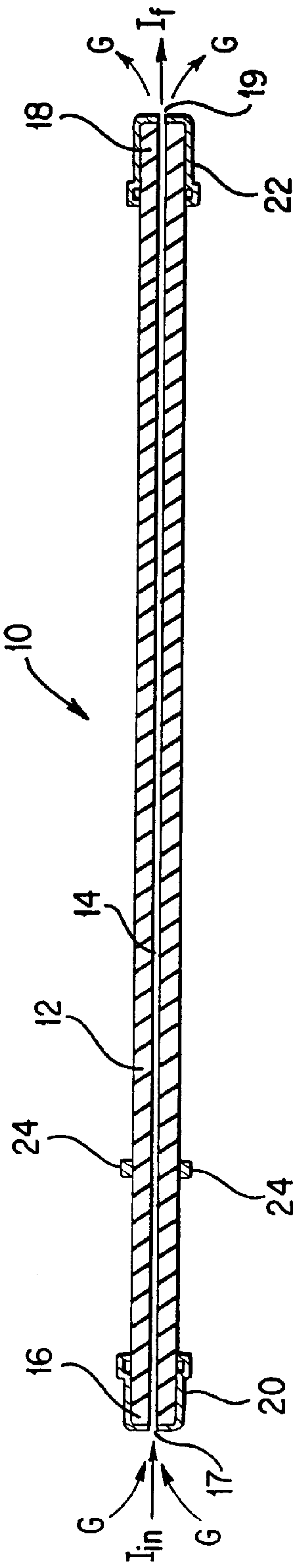
FIG. 1 is a diagrammatic sketch in a sectional view showing an embodiment of apparatus according to the invention.

Referring now to the drawings, there is shown in FIG. 1 generally at 10 an embodiment of apparatus according to the invention. The apparatus includes a tube of a dielectric material, having tube wall 12 defining a lengthwise bore or lumen 14 of capillary dimension. The tube has an inlet opening 17 to the lumen at an inlet end 16, and an exit opening 19 at an exit end 18. End electrode 20 is associated with the inlet end 16 and end electrode 22 is associated with the exit end 18. An additional electrode 24 is associated with the tube at a point along the tube length between the inlet end electrode and the outlet end electrode. When the apparatus is in operation, each of the electrodes is connected to a source of electrical potential (not shown in the FIG.).

Figure 4:
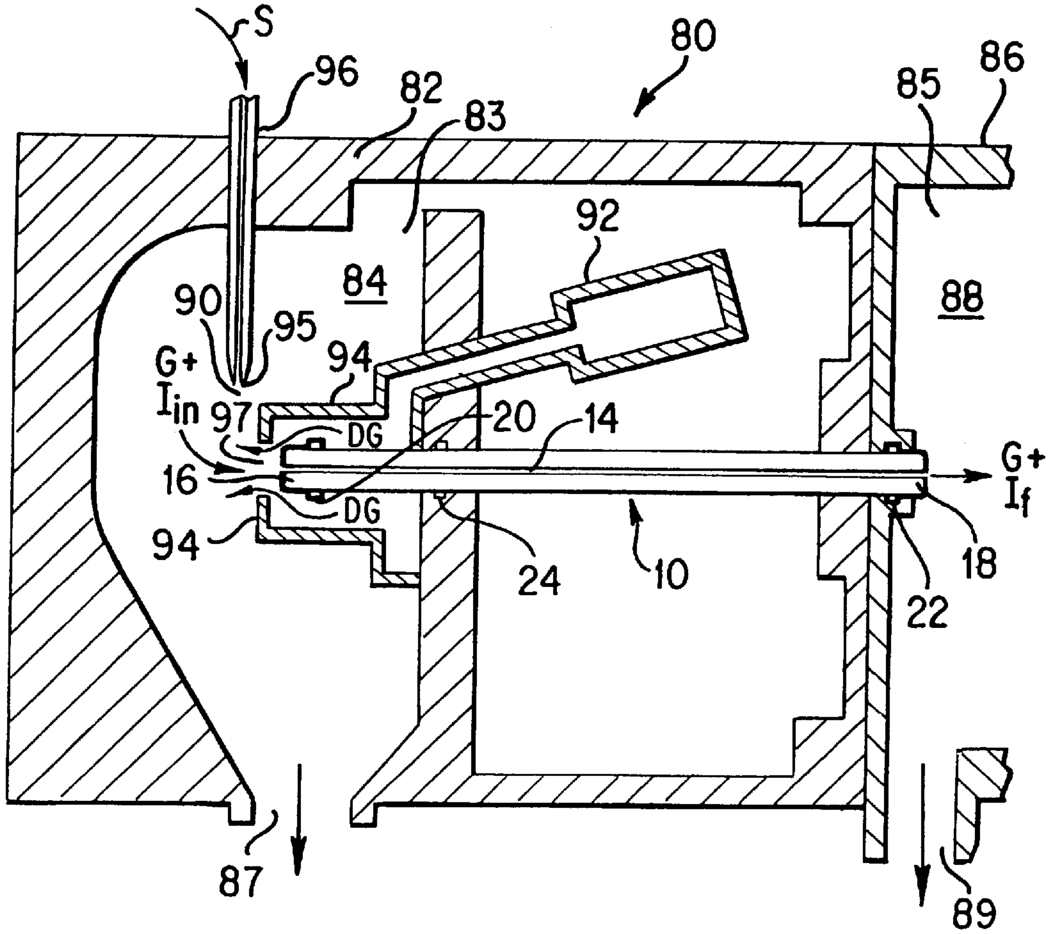
FIG. 4 is a diagrammatic sketch in a sectional view showing an example of an embodiment of mass spectrometry apparatus employing apparatus according to the invention.

FIG. 4 shows by way of example API mass spectrometry apparatus generally at 80, having apparatus 10 as in FIG. 1 installed according to an embodiment of the invention. The apparatus 80 includes walls (e.g., 82) defining an ionization chamber 83 in which the enclosed volume 84 is at higher pressure, typically about atmospheric pressure, when the apparatus is in operation; and walls (e.g., 86) defining a vacuum chamber 85 (shown in part in the FIG.) in which the enclosed volume 88 is at reduced pressure, typically in the range 10 torr to $10^{-8}$ torr. In some mass spectrometer configurations the vacuum chamber 85 may contain elements (not shown in the FIG.) such as, for example, a mass analyzer, that function at very high vacuum. In other configurations the vacuum chamber 85 may constitute a stage between the ionization chamber and mass analyzer and may contain, for example, ion optical elements or ion guides which operate under vacuum but not at very high vacuum characteristic of operation of the mass analyzer.

In the embodiment illustrated in FIG. 4, an electrospray assembly 96 is employed. The electrospray assembly receives liquid samples (arrow S) from a sample source (not shown in the FIG.), such as for example, a liquid chromatography device, and produces at an electrospray exit 95 an aerosol directed generally into an ionization region 90. The tip of the electrospray assembly at the exit 95 is connected to a source of electrical potential (not shown), which may be held at ground potential or at some potential above or below ground potential, as described in further detail below. Formation of the aerosol may be assisted by use, for example, of pneumatic nebulization.

The volume within the ionization chamber 83 is maintained at about atmospheric pressure by exhaust through port 87, and the volume within the downstream vacuum chamber 85 is maintained at the appropriate vacuum by pumping out through vacuum port 89. Accordingly, a steep pressure gradient is maintained between the ionization chamber and the vacuum chamber.

Apparatus 10 is installed in mass spectrometry apparatus 80 as an interface between the ionization chamber and the vacuum chamber. The inlet end 16 with associated electrode 20 is located in ionization chamber 83 downstream from ionization region 90, and the exit end 18 with associated electrode 22 is located in vacuum chamber 85. A source 92 of drying gas provides a flow of heated gas to an enclosure formed by a cowl 94, which directs the drying gas generally upstream (arrows DG) through an opening 97 toward the ionization region 90, where it passes through the cloud of droplets formed by the electrospray assembly 96. The cowl may be connected to a source of electrical potential, and may be employed to generate and to shape an electric field within the ionization chamber.

Gas (including vapor) together with ions formed in the ionization region 90 flows (arrow G+$I_{in}$) from the higher-pressure volume 84 into the inlet opening in the inlet end 16 of the capillary. In conventional operation, ions entrained in the gas flow within the lumen of the capillary are carried toward the lower pressure volume 88, and emerge from the exit opening in the exit end 18 of the capillary into the downstream vacuum chamber 85.

Figure 5A:
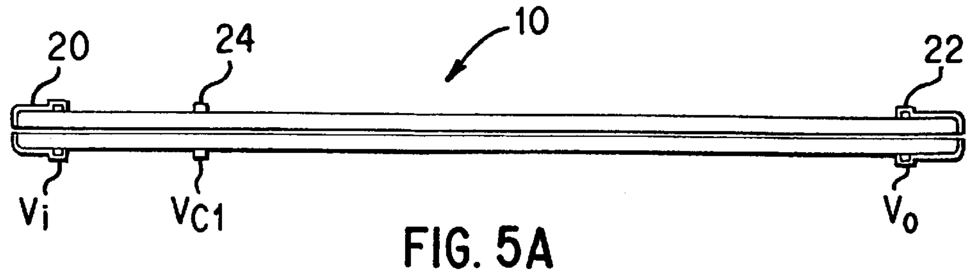
FIG. 5A is a diagrammatic sketch in sectional view of an embodiment of apparatus according to the invention.
Figure 5B:
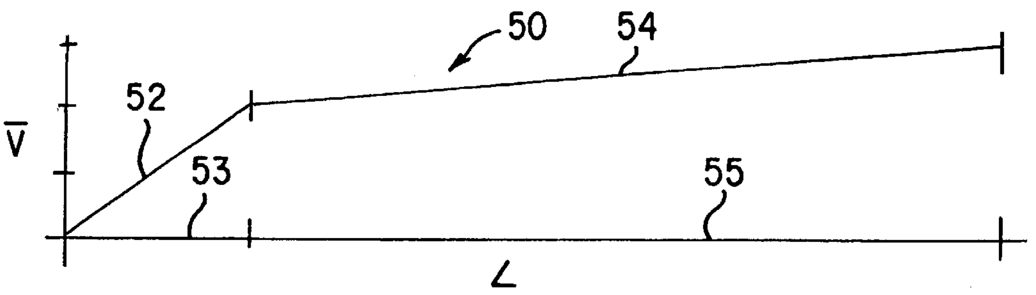
FIG. 5B is a diagram of an idealized electric field over the length of the capillary interface in FIG. 5A in operation according to the invention.

According to the invention, electric potentials are applied to the inlet and exit end electrodes 20, 22 and to the additional electrode 24, to produce a steeper voltage gradient in an upstream portion than along a downstream portion of the capillary. Reference is now made to FIGS. 5A, 5B. FIG. 5A shows apparatus 10, generally as described with reference to FIG. 1, and FIG. 5B shows diagrammatically at 50 an idealized gradient of electrical potentials (V) generated over the length (L) of the capillary by application of selected electrical potentials at the electrodes. An electrical potential $V_{cl}$ is applied at the additional electrode 24, and an electrical potential $V_i$ is applied at the inlet electrode 20, and an electrical potential $V_o$ is applied at the exit electrode 22. The different voltages are set, according to the invention, so that the portion 52 of the voltage gradient generally upstream from the additional electrode 24 is steeper than the portion 54 of the voltage gradient more downstream. The voltages are set so that the steeper upstream portion 52 of the voltage gradient (over an upstream portion 53 of the capillary length) is sufficiently steep to cause ions having drift velocities below a selected lower limit to stall within the capillary lumen, and to drift to the walls of the capillary. As a result, the subpopulation $I_f$ of ions emerging in the gas flow from the capillary exit (G+$I_f$ in FIG. 4) and entering the free jet expansion in the vacuum chamber has a higher proportion of ions having drift velocities above the selected limit, than were present in the population $I_{in}$ that had flowed into the capillary inlet.

In FIG. 5B the gradients are shown as relative absolute values. For operation in positive ion mode, for example, the input end voltage $V_i$ is electronegative as compared with the exit end voltage $V_o$. For operation in negative ion mode, for example, the input end voltage $V_i$ is electropositive as compared with the exit end voltage $V_o$. The additional electrode voltage $V_{cl}$ is selected, according to the position of the electrode along the length of the capillary, and according to the operational mode, to provide a voltage gradient from the input electrode that is sufficiently steep to retard the passage of ions having drift velocities below the selected limit. In some embodiments the end-to-end potential difference (absolute value) is in the range 500 V to 8 kV, or in some embodiments 500 V to 5 kV. The potential difference (absolute value) between the additional electrode voltage $V_{cl}$ and the inlet electrical potential $V_i$ can be determined for a desired lower drift velocity threshold and for a particular device configuration readily and as a matter of routine. For example, an assortment of molecules having known masses may be tested using various potentials, and the extent to which the test molecules pass through the conduit can be determined by measuring the signal produced by ions arriving at a detector. The results can provide a voltage range calibration for the particular device for filtration of ions having a range of masses.

The drift velocities of ions passing through the conduit depend in part upon the kinetic energy of the ions, the drift velocities of a population of ions passing through the capillary can be raised or lowered by increasing or decreasing the temperature. This can be accomplished, for example, by heating or cooling the capillary, or by changing the temperature of the drying gas.

Figure 2:
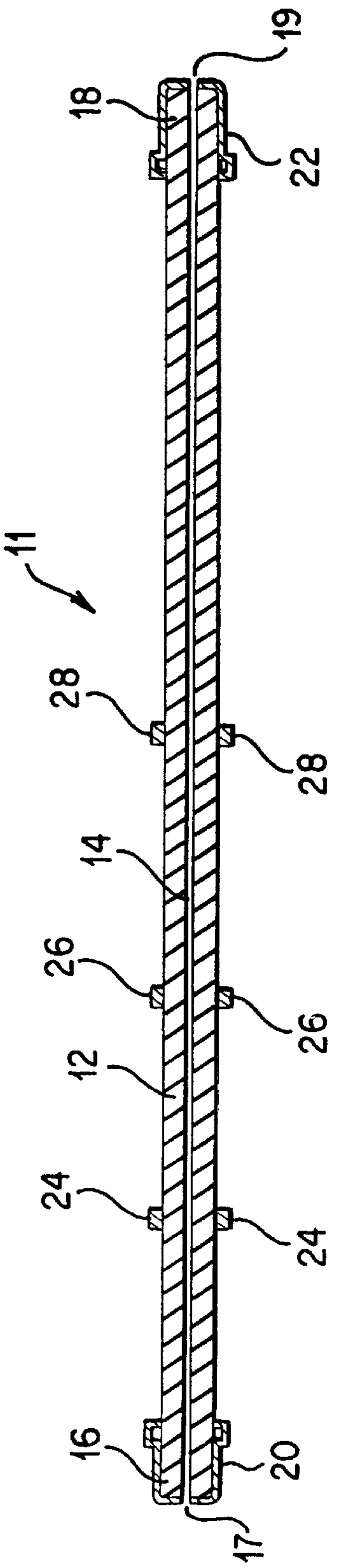
FIG. 2 is a diagrammatic sketch in a sectional view showing an alternative embodiment of apparatus according to the invention.

The effectiveness of the filter according to the invention can be improved providing more than one additional electrode at points along the length of the capillary and, in particular, by setting the voltages of any two or more pairs of electrodes to generate two or more retarding voltage gradients. Referring now to FIG. 2, there is shown generally at 11 apparatus according to the invention in which two separate retarding voltage gradients can be maintained. As in FIG. 1, the apparatus 11 in FIG. 2 includes a tube of a dielectric material, having tube wall 12 defining a lengthwise bore or lumen 14 of capillary dimension. The tube has an inlet opening 17 to the lumen at an inlet end 16, and an exit opening 19 at an exit end 18. End electrode 20 is associated with the inlet end 16 and end electrode 22 is associated with the exit end 18. Additional electrodes 24, 26, 28 are associated with the tube at points along the tube length between the inlet end electrode and the outlet end electrode. Each of the electrodes is connected to a source of electrical potential (not shown in the FIG.).

Figure 6A:
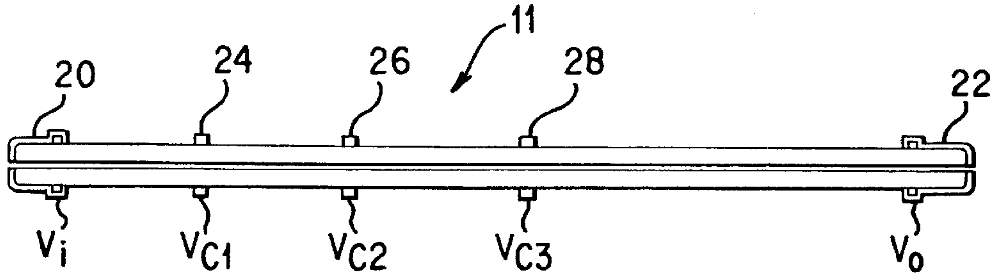
FIG. 6A is a diagrammatic sketch in sectional view of an embodiment of apparatus according to the invention.
Figure 6B:
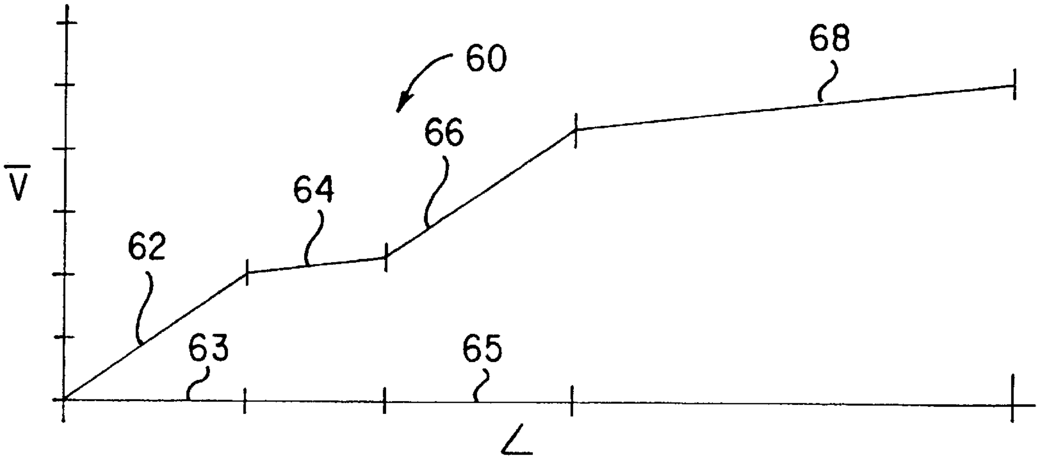
FIG. 6B is a diagram of an idealized electric field over the length of the capillary interface in FIG. 6A in operation according to the invention.

To provide two retarding voltage gradients using apparatus according to the invention as in the embodiment of FIG. 2, electric potentials are applied to the inlet and exit end electrodes 20, 22; and to the additional electrode 24, to produce a first steeper voltage gradient in the portion of the capillary between the inlet electrode 20 and the additional electrode 24, and also to the additional electrodes 26, 28 to produce a second steeper voltage in the portion of the capillary between additional electrodes 26 and 28. Reference is now made to FIGS. 6A, 6B. FIG. 6A shows apparatus 11, generally as described with reference to FIG. 2, and FIG. 6B shows diagrammatically at 60 an idealized gradient of electrical potentials (V) generated over the length (L) of the capillary by application of selected electrical potentials at the electrodes. Electrical potentials $V_{c1}$, $V_{c2}$, $V_{c3}$ are applied at the additional electrodes 24, 26, 28, respectively, and electrical potentials $V_i$, $V_o$ are applied at the inlet and exit electrodes 20, 22. The different voltages are set, according to the invention, so that the portion 62 of the voltage gradient generally upstream from the additional electrode 24 and the portion 66 of the voltage gradient generally between the additional electrodes 26, 28 are steeper than other portions, e.g., 64, 68 of the voltage gradient elsewhere along the length of the capillary. The voltages are set so that the steeper upstream portion 62 of the voltage gradient (over an upstream portion 63 of the capillary length) is sufficiently steep to cause ions having drift velocities below a selected lower limit to stall within the capillary lumen, and to drift to the walls of the capillary, and, similarly, so that the steeper portion 66 of the voltage gradient (over a second portion 65 of the capillary length) is sufficiently steep to cause ions having drift velocities below a selected lower limit (which may be the same as or different from the lower limit selected for the upstream retarding gradient) to stall within the capillary lumen, and to drift to the walls of the capillary,. As a result, the subpopulation $I_f$ of ions emerging in the gas flow from the capillary exit (G+$I_f$ in FIG. 4) and entering the free jet expansion in the vacuum chamber has a higher proportion of ions having drift velocities above the selected limit (s), than were present in the population $I_{in}$ that had flowed into the capillary inlet. Where the selected lower limits are the same, the second retarding gradient can remove ions below the limit that may have escaped the upstream retarding gradient. In the voltage profile shown in FIG. 6B the voltages are set so that a less steep voltage gradient is present between the steeper portions. As may be appreciated, the respective voltages may be set such that the voltage gradient between the steeper portions is flat, or such that a nonopposing gradient is created between the steeper portions. Also, in the voltage profile shown in FIG. 6B the voltages are set so that the retarding voltage gradients have about the same steepness. As may be appreciated, retarding voltage gradients of different steepness may be applied, either to more completely remove ions having drift velocities below a particular limit, or to remove ions having drift velocities below a different limit, in a more downstream segment of the capillary. Other voltage profiles may be created using a configuration as in FIG. 6A. For example, the voltages may be set so that the voltage profile has a first shallower voltage gradient (generally between electrodes 20 and 24), followed downstream by a first steeper voltage gradient (generally between electrodes 24 and 26) sufficient to retard movement of ions having drift velocities below a selected lower limit, in turn followed downstream by a next shallower voltage gradient (generally between electrodes 26 and 28), finally followed downstream by a next steeper voltage gradient (generally between electrodes 28 and 22) sufficient to retard movement of ions having drift velocities below a selected lower limit.

The apparatus of the invention may be fabricated from any of a variety of materials, in any of a variety of ways. The dielectric material of which the conduit is constructed can be a glass such as a borosilicate glass, or a quartz, or a ceramic, or a plastic such as a polytetrafluoroethylene ("PTFE", Teflon®) or a polyimid (Vespel®). The electrodes can be constructed as fittings or as coatings of an electrically conductive material, or as a combination of coatings and fittings. The electrically conductive material can be a relatively nonreactive electrically conductive metal such as, for example, chromium or silver or gold or platinum. Where a fitting is used the fitting may be, for example, a metal cap or sleeve configured to slip over the tube, or a metallized cap or sleeve constructed of a nonconductive material which may conveniently be a deformable (such as a elastic or resilient material) to provide for a secure fit onto the tube. Where a coating is used it may be preferable to employ two or more electrically conductive coatings, a first one of which has characteristics of good adherence to the surface of the dielectric material, and an additional one of which has desirable mechanical and other properties not provided by the first-applied electrically conductive material. And, where a coating is used it can be applied, for example, by conventional sputter coating or vapor coating, by electrodeless plating, or by a conventional chemical deposition technique, using for example a ceramic paint or a metal paint such as a gold paint or silver paint, or, for example, chrome hexacarbonate in an organic solvent such as chloroform.

As described above, the retarding voltage gradient causes ions having drift velocities below a lower limit to stall out of the gas flow in the bore of the tube and to impact the lumenal wall of the tube. Ordinarily, their electrical charge dissipates. Where the quantity of ions impacting the tube wall is high, the dielectric material of the tube may be unable to carry the charge away, and undesirable charging effects may result. As is described in co-pending U.S. patent application Ser. No. 09/352,467, filed Jul. 14, 1999, pertinent parts of which are hereby incorporated by reference herein, end-charging within the bore of the conduit can be reduced by providing that the lumenal surface of an end portion of the tube be of an electrically conductive material that carries away electrical charge resulting from ion collisions with the lumenal surface. The electrically conductive portion of the lumenal surface may be constructed as an endpiece defining a bore having an electrically conductive lumenal surface and contiguous with the lumenal surface of the capillary tube at that end; or it may be constructed by providing an electrically conductive coating within a portion of the lumenal surface.

Figure 3:
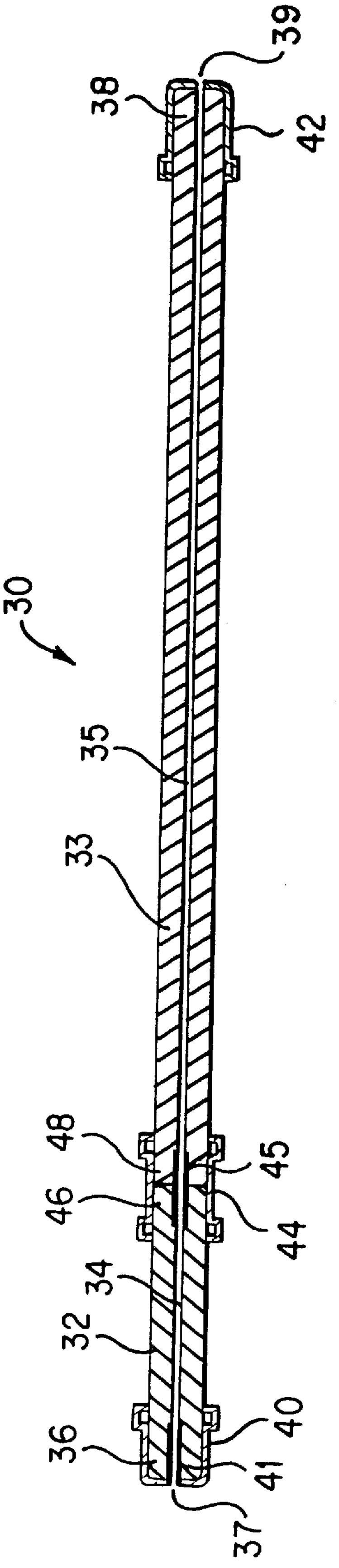
FIG. 3 is a diagrammatic sketch in a sectional view showing another alternative embodiment of apparatus according to the invention.

Similarly, undesirable charging effects resulting from impact of stalled ions within the tube according to the present invention can be reduced by providing an electrically conductive surface within the lumen of the tube in regions along the tube length where collision of stalled ions may be expected to result from application of a retarding voltage gradient, and providing for electrical connection of the electrically conductive surface to a charge sink. One embodiment of apparatus according to the present invention, which is provided over a portion of its lumen with an electrically-conductive surface for carrying away charge and reducing charging effects, is shown by way of example generally at 30 in FIG. 3. In this embodiment the dielectric capillary is provided in two sections, 32 and 33, the walls of which define lengthwise bores or lumens 34 and 35, respectively. The capillary sections are joined end-to-end with the axes of the bores aligned, so that together they define a straight bore of substantially uniform diameter having an inlet 37 and an exit 39. An inlet end 36 of capillary section 32 is provided with an inlet end electrode 40, and an exit end 38 of capillary section 33 is provided with an exit end electrode 42. Where the other ends, respectively 46, 48, of capillary sections 32 and 33 are joined, an additional electrode 44 is provided. A portion of the surface of the lumen 34 of the inlet end of capillary section 32 is provided with an electrically conductive coating 41. And portions of the surfaces of the lumens 34, 35 near the ends 46, 48 are similarly provided with an electrically conductive coating 45. The respective lumenal surface coatings are formed in electrically conductive contact with the respective electrodes, as described in detail in U.S. Ser. No. 09/352,467. The electrodes are connected to a source of electrical potential. In operation, the voltages are set so that a retarding voltage gradient is established over the upstream portion of the capillary (generally, that is, over the length of capillary segment 32), sufficiently steep to retard the downstream movement of ions having drift velocities below the desired lower limit. As the stalling ions impact the electrically conductive lumenal surface 45 near the additional electrode 44, the charges are carried away from the lumenal surface by way of the electrode 44.

EXAMPLE

By way of example, a prototype was constructed using a glass capillary having length 180 mm, and bore diameter 0.5 mm. The end electrodes were formed by metallizing the glass surface over a portion of the ends. The additional electrode was constructed as a metallized ball seal press-fitted over the capillary and positioned at a distance about 75 mm from the inlet end and connected by wire to a voltage source. The apparatus was installed in a Hewlett-Packard G1946A, employing pneumatic nebulizer $N_2$ assisted ESI.

A solution in methanol:water (1:1) of three different analytes having known molecular weights of about 200, 400, and 600 were introduced at a rate about 50 μL/min. employing a nebulizer pressure about 20 p.s.i. Nitrogen was employed as a drying gas, at a flow rate about 10 L/min., and in separate runs at about 300° C. and about 200° C. The capillary inlet voltage was set at 6 kV and the exit voltage was set at 65 V, and the retarding voltage at the additional electrode was varied in the range from about +7 kV to ground. The The results, generally, were as follows. At each of the drying gas temperatures, application of a sufficiently steep retarding voltage gradient removed ions from the population passing through the capillary. Within a range of retarding potential gradient steepness, lower molecular weight ions were removed in higher proportions than higher molecular weight ions, providing for removal of lower molecular weight ions while permitting passage of higher molecular weight ions. Moreover, at the higher drying gas temperature a shallower voltage gradient is effective to remove ions of a given molecular weight than at the lower drying gas temperature.

Other embodiments are within the claims.

For example, any desired number of additional electrodes can be arranged along the length of the capillary and associated closely with it, all of them connected to sources of electrical potential. In operation of the apparatus according to the invention, the voltages at any selected two of such electrodes or at any selected one of such electrodes in addition to an end electrode, can be provided to generate a retarding voltage gradient in the capillary segment between them.

Additionally, the voltages at selected ones of the electrodes may be varied over the course of treatment of a sample, to progressively change the slope of the potential gradient, accordingly changing the lower limit of drift velocity of ions passing the retarding gradient.

Time varying potentials (including alternating sign potentials) may be applied to any selected two of the electrodes; the electrodes can be separated at a suitable distance along the capillary length, and the voltage ranges and the frequencies and phase differences can be selected to provide an effective trap within the capillary for ions having selected lower drift velocities.

Alternatively the potential across any two electrodes can be held at a fixed point for a time, and the temperature of the ions traversing the capillary bore can be changed, for example by changing the temperature of the drying gas. An increase in the temperature of the gas traversing the capillary increases the respective drift velocities of the ions, so that some of the ions, which have lower mass and cross section and which stall out in the retarding voltage segment at a higher temperature are able to pass through the retarding voltage gradient at a lower temperature.

Moreover, ions having a given mass that are moving near the axial center of the capillary bore can have faster drift velocities than those nearer to the wall, and the result is a gradually degrading drift velocity profile farther downstream along the tube. In such a case, selectively warming or cooling the tube itself at one or more locations along its length may have the effect of making the drift velocity profile more uniform throughout the cross section of the bore. The conduit wall may be heated or cooled by any of a variety of means, as will be apparent to the skilled artisan, such as an electrical heating element arranged about the tube. Application of a retarding potential gradient according to the invention may result in a sharper ion mass cutoff where the velocity profile has been adjusted in this way.

Typically, the voltages of elements within the ionization chamber will be set so that the electric field about the ionization region is shaped to attract ions of the desired polarity toward the inlet end of the capillary interface. Particularly, for example, where a cowl is present as illustrated in FIG. 4, the voltage at the cowl is set electronegative (for operation in "positive ion" mode) with respect to the ion source. The ion source (for example, the corona discharge needle for APCI; the electrospray needle for ESI, etc.) may be set at ground or, depending upon the configuration of the apparatus and the environment in which it is operated, at a convenient voltage above or below ground. The other electrodes are then set or varied in relation to the voltage of the ion source.

The apparatus of the invention can be employed with any of a variety of ionization techniques, including for example atmospheric pressure ionization techniques such as electrospray ionization or inductively coupled plasma ionization or atmospheric pressure chemical ionization. The apparatus can be employed with any of a variety of mass analytical techniques, including for example magnetic sector, quadrupole (and other multipole), ion trap, time-of-flight, and Fourier-transform (ion cyclotron resonance) techniques, and tandem MS/MS techniques.

What is claimed is:

1. A conduit for transporting ions from a higher pressure ion source to a mass analyzer at high vacuum in mass spectrometry apparatus, comprising a tube constructed of a dielectric material and defining a capillary bore extending from end to end, wherein the tube has an end electrode associated with each end and at least one additional electrode associated with the tube between the ends, and wherein the electrodes are connected to a source of electrical potential, whereby in operation electric potentials applied to the electrodes create an end-to-end electric field generally opposing gas flow-assisted movement of ions within the conduit, which electric field has a steeper voltage gradient along an upstream portion than along a downstream portion of the conduit, wherein the voltage gradient along the steeper upstream portion of the conduit retards downstream movement through and out from the conduit of ions having drift velocities below a selected lower limit.

2. The conduit of claim 1 wherein the ion source is an atmospheric pressure ionization source.

3. The conduit of claim 1, comprising at least two additional electrodes associated with the tube between the ends, the electrodes being connected to a source of electrical potential.

4. The conduit of claim 3, whereby the end-to-end electric field has at least two steeper voltage gradients along portions of the conduit, wherein the voltage gradient along the steeper portions of the conduit retards downstream movement through and out from the conduit of ions having drift velocities below a selected lower limit.

5. The conduit of claim 4, further comprising means for changing the temperature of the ions.

6. The conduit of claim 5 wherein the temperature changing means comprises means for directing a heated drying gas into an ionization region of the ionization chamber.

7. The conduit of claim 5 wherein the temperature changing means comprises at least one heater associated with a wall of the conduit.

8. The conduit of claim 5 wherein the temperature changing means comprises at least one cooler associated with a wall of the conduit.

9. The conduit of claim 1, further comprising means for varying the electrical potential at at least one of the electrodes during operation of the apparatus.

10. A method for delivering ions from a higher pressure ionization chamber to a mass analyzer operating at high vacuum employs a conduit that includes a tube constructed of a dielectric material and defining a capillary bore from end to end and having an electrode associated with each end and at least one additional electrode associated with the tube between the ends, the method comprising applying electrical potentials to the electrodes to generate an end-to-end electric field having a voltage gradient that is steeper along an upstream portion of the conduit than along a downstream portion of the conduit such that:

the end-to-end electric field generally opposes gas flow-assisted movement of ions within the conduit, and the steeper voltage gradient upstream retards downstream movement of ions having lower drift velocities and thereby reduces the flow of ions having lower drift velocities through and out from the conduit to the mass analyzer.

11. The method of claim 10 wherein said conduit comprises at least two additional electrodes associated with the tube between the ends, and wherein the step of applying electrical potentials to the electrodes generates at least two steeper voltage gradients that retard downstream movement of ions having drift velocities below at least one lower limit.

12. The method of claim 10, further comprising the step of changing the temperature of gas flowing within the conduit.

13. The method of claim 12 wherein the step of changing the gas temperature comprises raising the temperature of gas flowing into the conduit.

14. The method of claim 12 wherein the step of changing the gas temperature comprises directing a flow of a drying gas into an ionization region of the ionization chamber.

15. The method of claim 12 wherein the step of changing the gas temperature comprises heating a wall of the conduit.

16. The method of claim 12 wherein the step of changing the gas temperature comprises cooling a wall of the conduit.

17. A method for effecting high pass ion filtration within a dielectric capillary interface between a higher pressure ionization chamber and the lower pressure environment of a mass analyzer in mass spectrometry apparatus, the method comprising applying electrical potentials to end electrodes and to at least one electrode associated with the dielectric capillary between the ends to create an end-to-end electric field generally opposing the gas flow-assisted movement of ions from the upstream end to the downstream end, and to create a steeper voltage gradient along an upstream portion than along a downstream portion of the capillary, whereby the voltage gradient along the steeper upstream portion of the capillary retards the downstream movement within the capillary of ions having drift velocities below a selected lower limit.

* * * * *